United States Patent
Kisaka et al.

(10) Patent No.: US 11,874,205 B2
(45) Date of Patent: Jan. 16, 2024

(54) GAS CHROMATOGRAPH

(71) Applicant: SHIMADZU CORPORATION, Kyoto (JP)

(72) Inventors: Ayaka Kisaka, Kyoto (JP); Yasuhiro Kimoto, Kyoto (JP); Yu Nagao, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 48 days.

(21) Appl. No.: 17/137,967

(22) Filed: Dec. 30, 2020

(65) Prior Publication Data
US 2021/0270786 A1   Sep. 2, 2021

(30) Foreign Application Priority Data

Feb. 28, 2020  (JP) ................................ 2020-032664

(51) Int. Cl.
  *G01N 30/38*  (2006.01)
  *G01N 30/02*  (2006.01)
(52) U.S. Cl.
  CPC ....... *G01N 30/38* (2013.01); *G01N 2030/025* (2013.01); *G01N 2030/382* (2013.01)
(58) Field of Classification Search
  CPC ....... G01N 2030/025; G01N 2030/324; G01N 2030/382; G01N 2030/385; G01N 30/38
  See application file for complete search history.

(56) References Cited

U.S. PATENT DOCUMENTS

| 9,435,774 B2 * | 9/2016 | Kawana | G01N 30/38 |
| 2018/0238840 A1 * | 8/2018 | Masuda | G01N 30/24 |

FOREIGN PATENT DOCUMENTS

| JP | 3160422 U | 6/2010 |
| JP | 2013-044647 A | 3/2013 |
| JP | 2018-136227 A | 8/2018 |

OTHER PUBLICATIONS

Communication dated Jul. 29, 2023 issued by the State Intellectual Property Office of the P.R. China in application No. 202110219905.8.
Office Action dated Mar. 7, 2023 in Japanese Application No. 2020-032664.

* cited by examiner

*Primary Examiner* — Harshad R Patel
*Assistant Examiner* — Gedeon M Kidanu
(74) *Attorney, Agent, or Firm* — Sughrue Mion, PLLC

(57) ABSTRACT

A gas chromatograph comprises a sample gas generation unit, separation column, and detector. Multiple gas sources serve as carrier gases to transport sample gas to the separation column. A switching component connects the gas sources to the sample gas generation unit based on user-input information. This information is stored in a gas type memory, which aids a gas type identification component in determining the carrier gas type by monitoring the switching component's status and referring to the stored data.

8 Claims, 6 Drawing Sheets

GAS CHROMATOGRAPH

BACKGROUND OF THE INVENTION

1. Field of the Invention

The present invention relates to a gas chromatograph.

2. Description of the Related Art

A gas chromatograph is configured to transfer sample gas generated by a sample gas generation part to a separation column, separate each component in the sample gas in the separation column, and detect each separated component in a detector. Carrier gas is supplied to the sample gas generation part in order to transfer the sample gas generated by the sample gas generation part to the separation column.

The gas chromatograph performs analysis while controlling the temperature of the separation column. However, if the temperature control of the separation column is stopped during a standby state in which analysis is not performed, it takes a long time to stabilize the temperature of the separation column at a predetermined temperature for analysis of a next sample. For this reason, it is common to continue the temperature control of the separation column even during the standby state. On the other hand, if the temperature control of the separation column is performed at a high temperature in a state where no fluid flows through the separation column, there is a problem that the deterioration of the stationary phase filling the separation column is promoted, and the life of the separation column is shortened. For this reason, it is common practice to keep the carrier gas flowing even during the standby state in which the sample is not analyzed.

Helium gas is generally used as the carrier gas. However, it is required to reduce the consumption of helium gas due to an increase in the price of helium gas and the like. For this reason, allowing one of two types of gas to be selectively supplied to the sample gas generation part, using helium gas as the carrier gas during analysis of a sample, and using gas other than helium gas such as nitrogen gas as column protection gas during the standby state have been proposed (see Japanese Patent Laid-open Publication No. 2013-044647).

SUMMARY OF THE INVENTION

Since characteristics such as viscosity differ depending on types of gas, in a case where a gas type of the carrier gas is switched, it is necessary to change a parameter for controlling a flow rate, pressure, and the like of the carrier gas. However, until now, a gas type of the carrier gas has not been able to be grasped on a system side. Accordingly, when the gas type of the carrier gas is switched, it has been necessary for the user to input what kind of gas is used as the carrier gas to allow the system to recognize the gas type. In a case where the user does not input the changed gas type of the carrier gas, control of a flow rate, pressure, and the like of the carrier gas cannot be performed accurately, and accurate information is not reflected in the analysis result.

The present invention has been made in view of the above circumstances, and an object of the present invention is to enable automatic recognition of a gas type of carrier gas in a gas chromatograph configured so that the gas type of the carrier gas can be changed.

A gas chromatograph according to the present invention includes a sample gas generation part configured to generate a sample gas using a sample injected thereinto, a separation column fluidly connected to an outlet of the sample gas generation part and for separating components in the sample gas generated by the sample gas generation part, a detector fluidly connected to an outlet of the separation column and for detecting the components separated in the separation column, a plurality of gas supply sources for supplying gases serving as carrier gas for delivering the sample gas generated by the sample gas generation part to the separation column, a switching part to which the plurality of gas supply sources are fluidly connected and configured to fluidly connect one of a plurality of the gas supply sources to the sample gas generation part selectively by switching a gas type setting part configured to set types of gases supplied from each of the plurality of gas supply sources connected to the switching part based on information input by the user, a gas type memorizing part configured to memorize an information as to types of the gases set by the gas type setting part, and a gas type identification part configured to recognize a state of the switching part and to identify a gas type of the carrier gas supplied to the sample gas generating part based on the state of the switching part and the information memorized in the gas type memorizing part.

The gas chromatograph according to the present invention includes the gas type setting part configured to set types of gases supplied from each of the plurality of gas supply sources connected to the switching part based on information input by the user, the gas type memorizing part configured to memorize types of gases set by the gas type setting part, and the gas type identification part configured to recognize a state of the switching part and to identify a gas type of the carrier gas supplied to the sample gas generating part based on the state of the switching part and the information memorized by the gas type memorizing part. Accordingly, the gas type of the carrier gas can be automatically recognized.

DETAILED DESCRIPTION OF THE INVENTION

Hereinafter, an embodiment of the gas chromatograph will be described with reference to the drawings.

Figure 1:
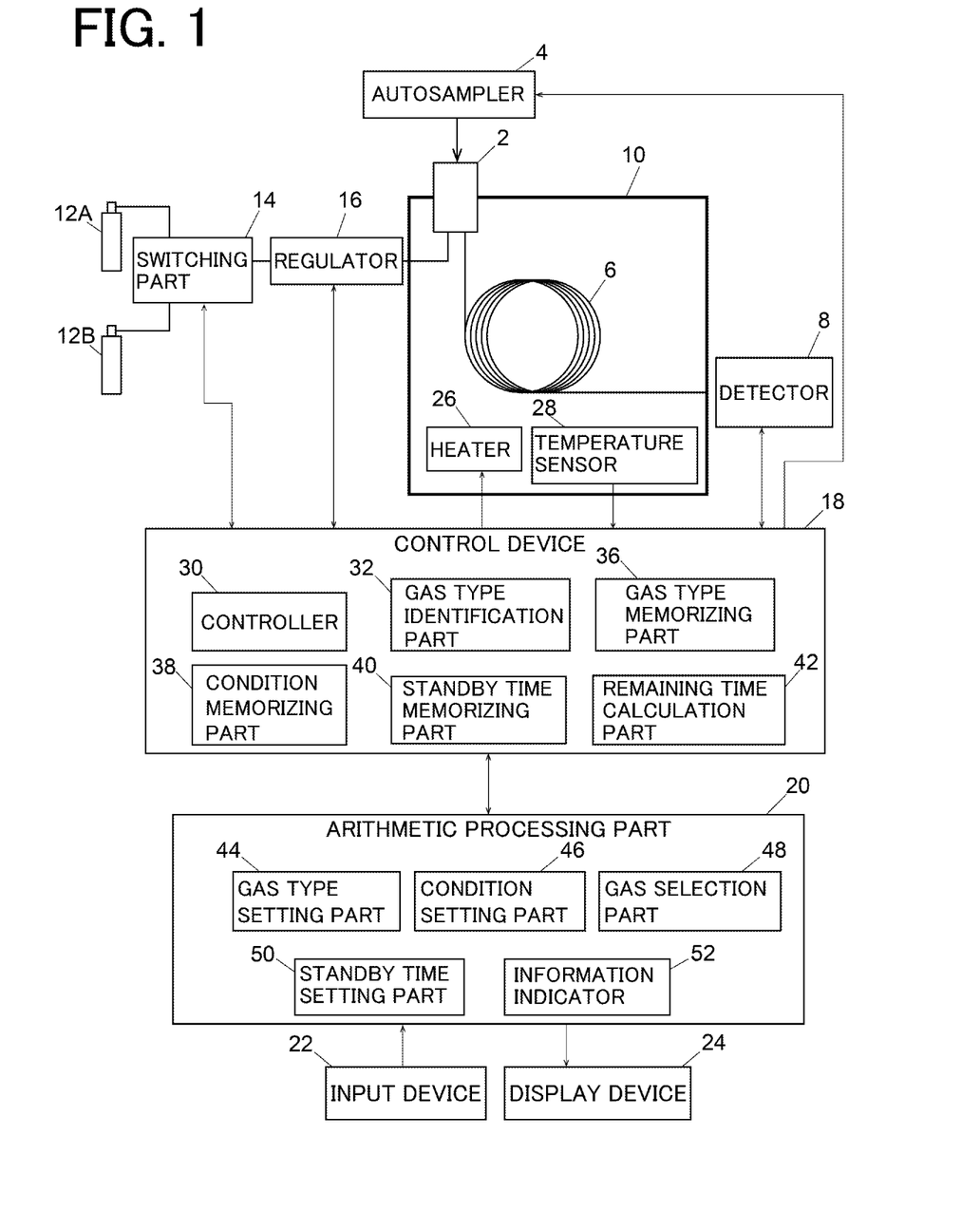
FIG. 1 is a schematic configuration diagram showing an embodiment of a gas chromatograph.

As shown in FIG. 1, the gas chromatograph of the present embodiment includes a sample gas generation part 2, an autosampler 4, a separation column 6, a detector 8, a column oven 10, gas supply sources 12A and 12B, a switching part 14, a regulator 16, a control device 18, an arithmetic processing part 20, an input device 22, and a display device 24.

The autosampler 4 is configured to automatically inject a sample into the sample gas generation part 2. The sample gas generation part 2 is provided inside with a sample vaporization chamber that vaporizes the sample injected by the autosampler 4 to generate sample gas. An inlet of the separation column 6 is fluidly connected to an outlet of the sample gas generation part 2, and the detector 8 is fluidly connected to an outlet of the separation column 6. The separation column 6 is for separating components included in the sample gas generated by the sample gas generation part 2, and the detector 8 is for detecting each component separated in the separation column 6. As the detector 8, a mass spectrometer (MS), a thermal conductivity detector (TCD), a flame ionization detector (FID), and the like can be used.

Gas from either one of the gas supply sources 12A and 12B is supplied as carrier gas to the sample vaporization chamber of the sample gas generation part 2. The sample gas generated in the sample gas generation part 2 is delivered to the separation column 6 by the carrier gas supplied from the gas supply source 12A or 12B. The switching part 14 is configured to fluidly connect either one of the gas supply sources 12A and 12B selectively to the sample gas generation part 2. The switching part 14 can be realized by, for example, a three-way solenoid valve. The regulator 16 is interposed between the switching part 14 and the sample gas generation part 2, and a flow rate of the gas supplied as the carrier gas to the sample gas generation part 2 is adjusted by the regulator 16. The regulator 16 has a function of adjusting a supply pressure and a supply flow rate of the gas from the gas supply source 12A or 12B.

Note that, in the present embodiment, either one of the two gas supply sources 12A and 12B is selected by the switching part 14. However, the present invention is not limited to this configuration, and one of three or more gas supply sources may be configured to be selected by the switching part 14.

The separation column 6 is housed in the column oven 10. The column oven 10 includes a heater 26 and a temperature sensor 28, and adjusts the temperature of the separation column 6 to a set temperature.

The control device 18 is realized by an electronic circuit (for example, a dedicated system controller) mounted with a central processing part (CPU) and a storage device, and performs operation control of the gas chromatograph. The arithmetic processing part 20 is realized by a dedicated or general-purpose computer provided so as to be able to communicate with the control device 18. In the arithmetic processing part 20, a parameter necessary for the control device 18 to perform operation control can be set. Further, analysis data obtained by the detector 8 is input to the arithmetic processing part 20 via the control device 18, and the arithmetic processing part 20 is mounted with a function of performing various types of arithmetic processing based on the analysis data. The input device 22 realized by a keyboard or the like, and the display device 24 realized by a liquid crystal display or the like are electrically connected to the arithmetic processing part 20. Information necessary for setting parameters such as an analysis condition is input to the arithmetic processing part 20 via the input device 22. Further, a result of arithmetic processing executed by the arithmetic processing part 20 is displayed on the display device 24.

The control device 18 includes a controller 30, a gas type identification part 32, a gas type memorizing part 36, a condition memorizing part 38, a standby time memorizing part 40, and a remaining time calculation part 42. The arithmetic processing part 20 includes a gas type setting part 44, a condition setting part 46, a gas selector 48, a standby time setting part 50, and an information indicator 52. The gas type identification part 32, the remaining time calculation part 42, the gas type setting part 44, the condition setting part 46, the gas selector 48, the standby time setting part 50, and the information indicator 52 are functions that can be obtained as the CPU executes a predetermined program. The gas type memorizing part 36, the condition memorizing part 38, and the standby time memorizing part 40 are functions realized by part of a storage area of the storage device.

The controller 30 is configured to perform operation control of the autosampler 4, the detector 8, the switching part 14, the regulator 16, and the heater 26 based on a standby condition and an analysis condition memorized in the condition memorizing part 38. The standby conditions are conditions such as a supply pressure and a supply flow rate of the carrier gas, a temperature of the separation column 6, and the like in a standby state in which analysis is not performed. The analysis conditions are conditions such as a supply pressure and a supply flow rate of the carrier gas, a temperature of the separation column 6, and the like in an analysis state in which analysis is performed. In the standby state, the controller 30 supplies the carrier gas of the set gas type to the sample gas generation part 2 at the set supply pressure and flow rate according to the standby condition memorized in the condition memorizing part 38, and controls the temperature of the separation column 6 to the set temperature. Further, in the analysis state, the controller 30 supplies the carrier gas of the set gas type to the sample gas generation part 2 at the set supply pressure and flow rate according to the analysis condition memorized in the condition memorizing part 38, and controls the temperature of the separation column 6 to the set temperature. When a transition is made to the standby state where the analysis of a next sample is possible, the controller 30 controls the gas type of the carrier gas, the supply pressure and flow rate of the carrier gas, and the temperature of the separation column 6 to be in an initial state in the analysis of the next sample.

The gas type of the carrier gas supplied from each of the gas supply sources 12A and 12B depends on a type of supply gas of a gas cylinder (gas supply source) that the user connects to each port of the switching part 14, and there is a case where gas of different types is supplied from the gas supply sources 12A and 12B as well as a case where gas of the same type is supplied. The user sets what kind of gas each of the gas supply sources 12A and 12B supplies.

Figure 2:
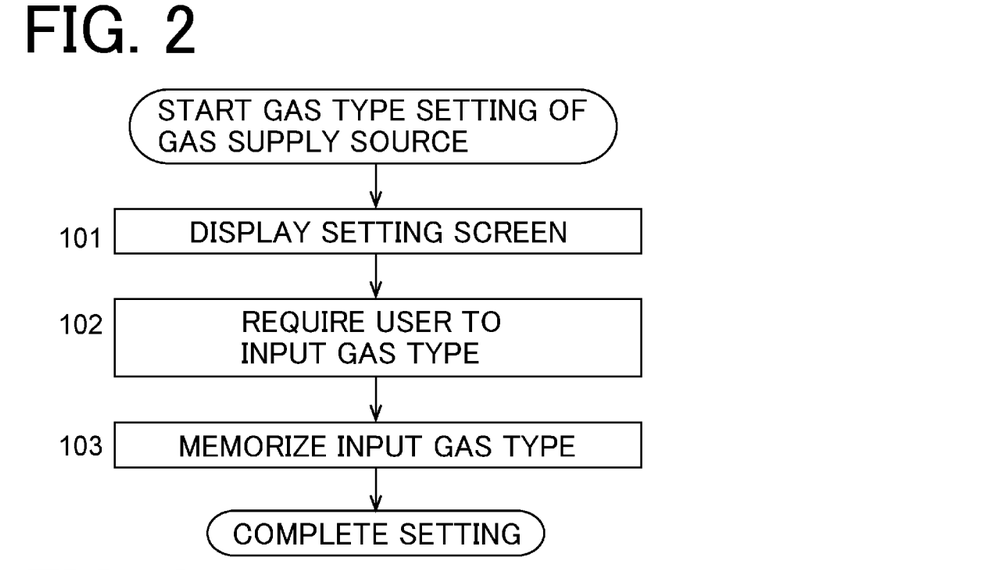
FIG. 2 is a flowchart showing an example of setting operation for a gas type of a gas supply source in the same embodiment.

As shown in FIG. 2, when the user inputs an instruction for setting a gas type to the arithmetic processing part 20, the gas type setting part 44 of the arithmetic processing part 20 displays a setting screen on the display device 24 (Step 101), and requires the user to input a gas type of each of the gas supply sources 12A and 12B connected to each port of the switching part 14 to set the gas type (Step 102). Information on the gas type of each of the gas supply sources 12A and 12B set by the gas type setting part 44 is transmitted to the control device 18 and memorized in the gas type memorizing part 36 (Step 103).

Figure 3:
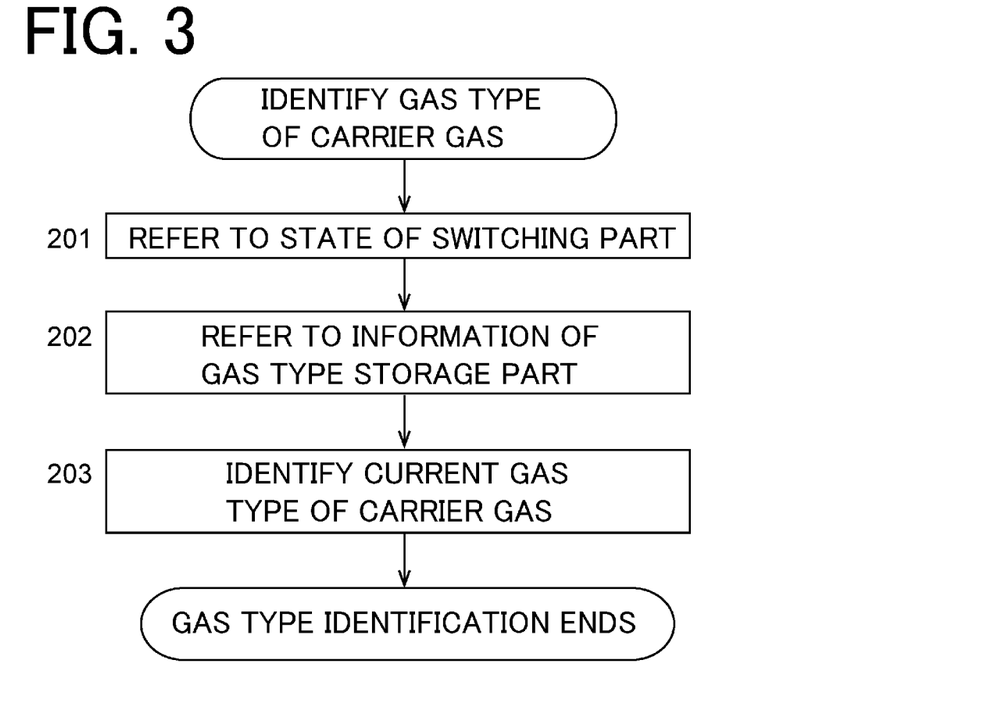
FIG. 3 is a flowchart showing an example of a specific operation for a gas type of carrier gas in the same embodiment.

By the above setting, the control device 18 recognizes the gas type of the carrier gas supplied from each of the gas supply sources 12A and 12B. The control device 18 can recognize a connection state of the port in the switching part 14 from a control state of the switching part 14 by the controller 30. For this reason, the control device 18 can identify the gas type of the carrier gas supplied to the sample gas generation part 2. Specifically, as shown in FIG. 3, the gas type identification part 32 of the control device 18 refers to the connection state between the ports in the switching part 14 (Step 201), and further refers to information memorized in the gas type memorizing part 36 (Step 202) so as to identify the gas type of the carrier gas supplied to the sample gas generation part 2. By the function of the gas type identification part 32, the gas type of the carrier gas supplied to the sample gas generation part 2 can be automatically recognized.

Since the viscosity differs depending on the gas type of the carrier gas, parameters for calculating a control amount of the regulator 16 differ for each of the gas type of the carrier gas. The controller 30 uses a parameter corresponding to the gas type of the carrier gas identified by the gas type identification part 32 to control the operation of the regulator 16 so that the supply pressure and the supply flow rate of the carrier gas to the sample gas generation part 2 become set values.

Figure 4:
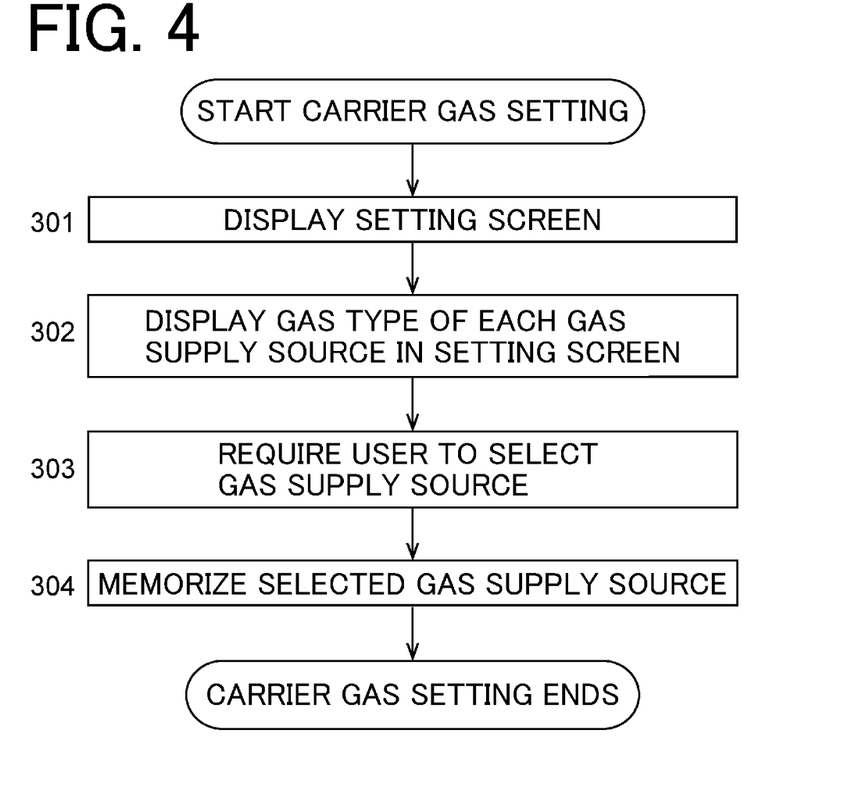
FIG. 4 is a flowchart showing an example of setting operation for the carrier gas in the same embodiment.

In the gas chromatograph of the present embodiment, the gas type of the carrier gas can be set as one of the analysis conditions or one of the standby conditions. When the user inputs an instruction for condition setting to the arithmetic processing part 20, the condition setting part 46 of the arithmetic processing part 20 displays a setting screen on the display device 24 as shown in FIG. 4 (Step 301). The condition setting part 46 displays the gas type of each of the gas supply sources 12A and 12B in the setting screen (Step 302), prompts the user to select a desired one of the gas supply sources 12A and 12B by showing the gas type of each of the gas supply sources 12A and 12B to the user (Step 303), and sets the gas source 12A or 12B to be used during the analysis or standby based on the selection. The analysis condition or standby condition set by the condition setting part 46 is transmitted to the control device 18 and held in the condition memorizing part 38 (Step 304).

Figure 5:
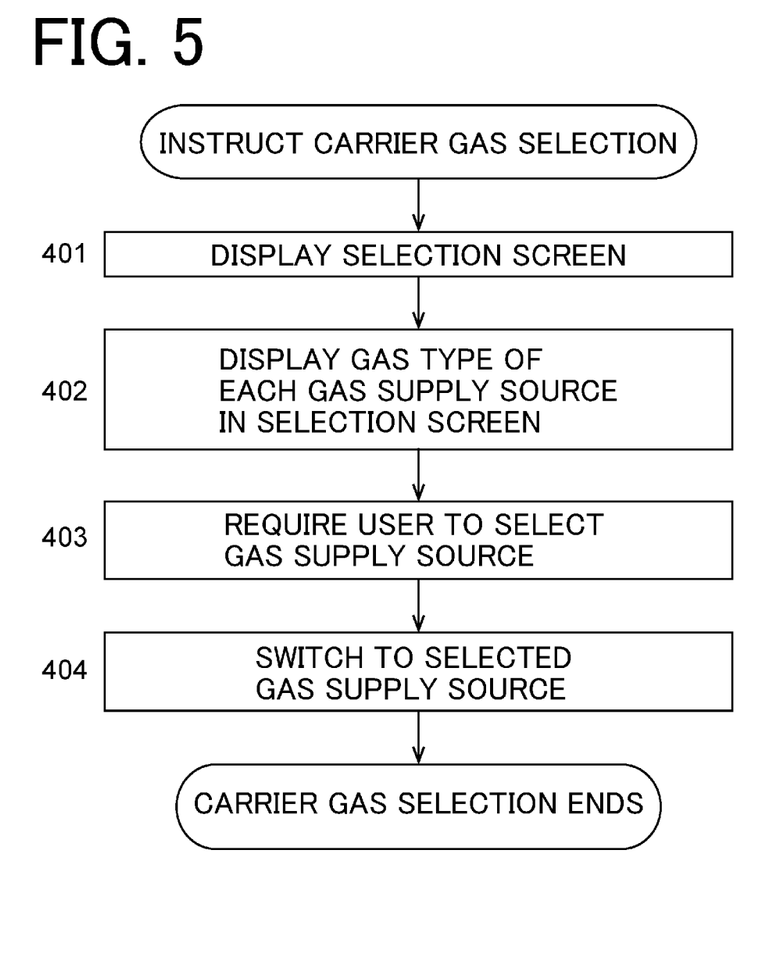
FIG. 5 is a flowchart showing an example of selection operation for the carrier gas in the same embodiment.

Further, in addition to setting the analysis condition and the standby condition, the user can switch the gas supply sources 12A/12B fluidly connected to the sample gas generation part 2 at an optional timing. When the user inputs an instruction for switching the gas supply source to the arithmetic processing part 20, the gas selector 48 of the arithmetic processing part 20 displays a selection screen on the display device 24 (Step 401). The gas selector 48 displays the gas types of the gas supply sources 12A and 12B in the selection screen (Step 402), and requires the user to select a desired one of the gas supply sources 12A and 12B by showing the gas type of each of the gas supply sources 12A and 12B to the user (Step 403). When the user selects and determines either one of the gas supply sources 12A and 12B, a signal regarding the selected gas supply source 12A or 12B is transmitted from the arithmetic processing part 20 to the control device 18, and the controller 30 controls the switching part 14 so that the gas supply source 12A or 12B desired by the user is connected to the sample gas generation part 2 (Step 404).

In a case where the gas supply sources 12A and 12B supply different types of gas, the gas type of the carrier gas is changed when the gas supply source is switched by the switching part 14. In such a case, the next analysis cannot be started until all the gas in paths through which the carrier gas flows, specifically, all the gas in the paths from the gas supply source 12A or 12B to the detector 8 via the sample gas generation part 2 and the separation column 6 is replaced with the gas after switching, which requires a certain period of the standby time. Further, even in a case where the gas supply sources 12A and 12B supply the same type of gas, if the purity of the gas is different from each other, it is not preferable to start next analysis before the gas in the paths through which the carrier gas flows is completely replaced.

Figure 6:
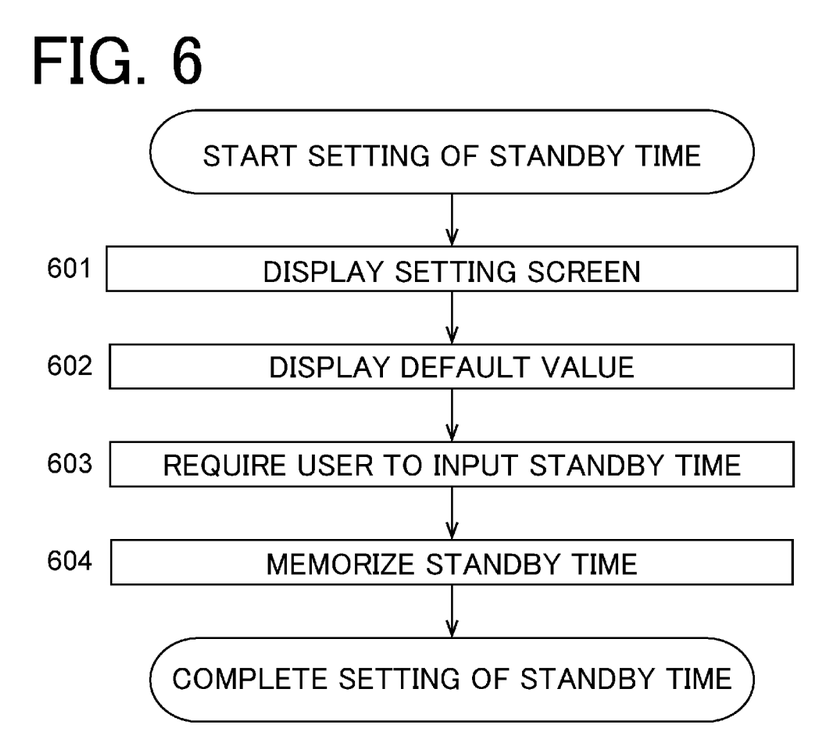
FIG. 6 is a flowchart showing an example of setting operation for standby time in the same embodiment.

In the present embodiment, the user can optionally set the standby time from the switching of the gas supply source to the standby state in which the analysis of a next sample becomes possible. When the user inputs an instruction for setting the standby time to the arithmetic processing part 20, the standby time setting part 50 of the arithmetic processing part 20 displays a setting screen for the standby time on the display device 24 (Step 601). The standby time memorizing part 40 has memorized a default value of the standby time, and the standby time setting part 50 displays the default value on the setting screen (Step 602). The standby time setting part 50 requires the user to input an optional value (Step 603), and sets the standby time accordingly. The standby time set by the standby time setting part 50 is transmitted to the control device 18 and memorized by the standby time memorizing part 40 (Step 604). Note that the display of the default value is not essential. However, by displaying the default value, the user can know a standard value of the standby time, and can easily set an appropriate standby time. The setting screen for the standby time may be part of the setting screen for the analysis condition. That is, the standby time may be set as one of the parameters of the analysis condition.

The standby time memorized by the standby time memorizing part 40 is applied in a case where the gas supply source is switched by the switching part 14. The information indicator 52 is configured so that when the gas supply source is switched by the switching part 14, the display device 24 performs in-replacing indication indicating that the gas in the circulation path of the carrier gas is being replaced. The information indicator 52 indicates the gas type of the carrier gas before the switching of the gas supply source and the gas type of the carrier gas after the switching of the gas supply source in a mode that is easy to visually recognize in the in-replacing indication. Furthermore, the information indicator 52 displays remaining time of the standby time until the replacement of the gas in the flow path of the carrier gas is completed as part of the in-replacing indication. The remaining time of the standby time is calculated by the remaining time calculation part 42. The remaining time calculation part 42 measures elapsed time from immediately after the switching of the gas supply source, and calculates the remaining time by subtracting the elapsed time from the standby time memorized by the standby time memorizing part 40.

A process of operation when the gas supply source is switched will be described with reference to the flowchart of FIG. 7.

When the gas supply source is switched by the switching part 14, the information indicator 52 performs the in-replacing indication on the display device 24 (Step 601). The remaining time calculation part 42 starts measurement of the elapsed time from after the switching of the gas supply source (Step 602), and calculates the remaining time of the standby time by subtracting the elapsed time from the standby time memorized by the standby time memorizing part 40 (Step 603). The information indicator 52 displays the remaining time calculated by the remaining time calculation part 42 in the in-replacing indication (Step 604). Waiting display is continuously displayed until the remaining time calculated by the remaining time calculation part 42 becomes zero (Step 605). When the remaining time calculated by the remaining time calculation part 42 becomes zero (Step 605, Yes), the information indicator 52 ends the in-replacing indication (Step 606), and the standby state is set.

Figure 7:
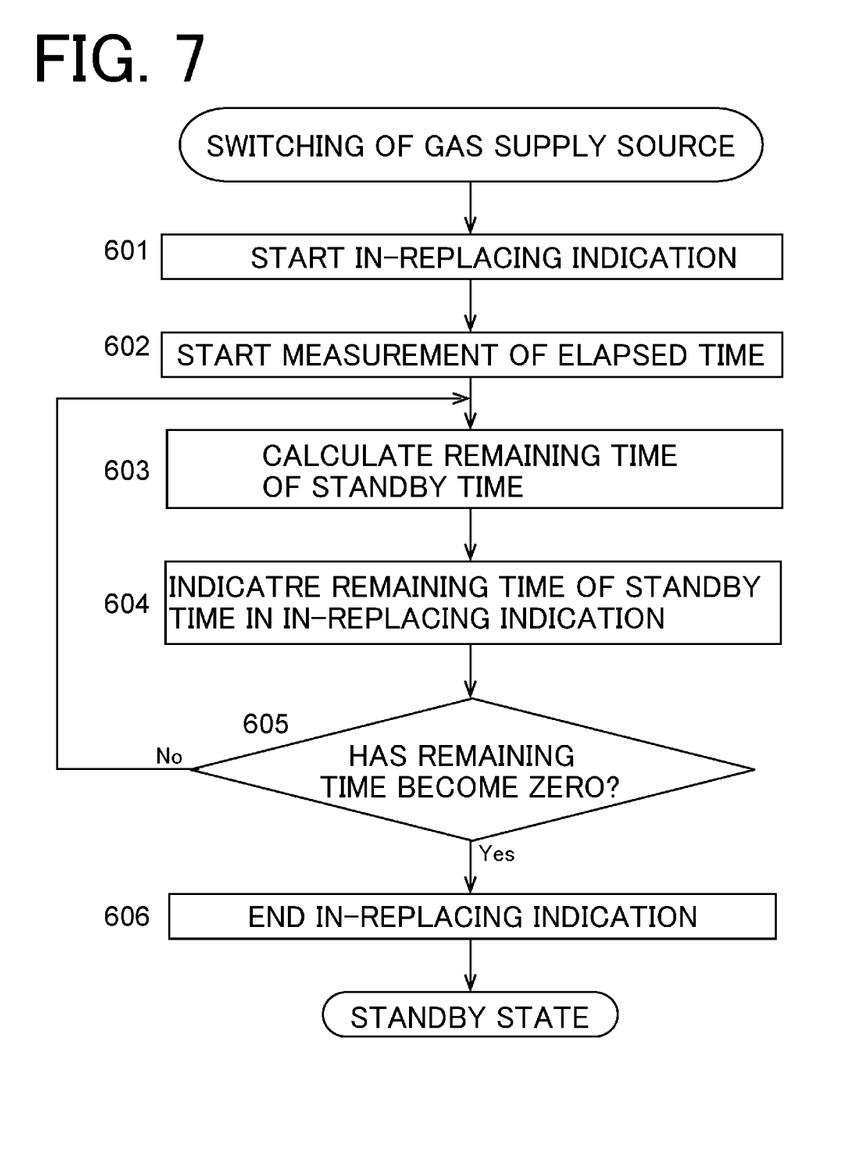
FIG. 7 is a flowchart showing an example of operation after changing the gas supply source in the same embodiment.

Note that, in the description using FIG. 7, when the gas supply source is switched by the switching part 14, the standby time is always applied and the in-replacing indication is performed. However, the present invention is not limited to this configuration. The configuration may be such that, when the gas supply source is switched by the switching part 14, whether or not the gas type of the carrier gas is changed based on the information memorized by the gas type memorizing part 36 is determined by the control device 18 or the arithmetic processing part 20, and, only in a case where it is determined that the gas type of the carrier gas is changed, the information indicator 52 performs the in-replacing indication on the display device 24.

The embodiment described above is merely an example of the embodiment of the gas chromatograph according to the present invention, and the embodiment of the gas chromatograph according to the present invention is as described below.

An embodiment of the gas chromatograph according to the present invention includes:
the sample gas generation part configured to generate a sample gas using a sample injected thereinto;
the separation column fluidly connected to an outlet of the sample gas generation part and for separating components included in the sample gas generated by the sample gas generation part;
the detector fluidly connected to an outlet of the separation column and for detecting the components separated in the separation column;
a plurality of the gas supply sources for supplying gas serving as carrier gas for delivering the sample gas generated by the sample gas generation part to the separation column;
the switching part to which the plurality of gas supply sources are fluidly connected and configured to fluidly connect one of the plurality of gas supply sources to the sample gas generation part selectively by switching;
the gas type setting part configured to set types of gases supplied from each of the plurality of gas supply sources connected to the switching part based on information input by the user;
the gas type memorizing part configured to memorize an information as to types of gases set by the gas type setting part; and
the gas type identification part configured to recognize a state of the switching part and to identify a gas type of the carrier gas supplied to the sample gas generating part based on the state of the switching part and the information memorized by the gas type memorizing part.

As a specific aspect [1] of the above embodiment, there is one that further includes the display device for displaying information to the user, the input device for information input, the condition setting part configured to set a gas type of the carrier gas as an analysis condition for analyzing a sample based on information input by the user using the display device and the input device, the condition memorizing part configured to memorize the analysis condition set by the condition setting part, and the controller configured to control operation of the switching part according to the analysis condition memorized in the condition memorizing part by using information memorized by the gas type memorizing part. According to such an aspect, the user can optionally set the gas type of the carrier gas used for analysis, and the carrier gas of the set gas type is automatically used in the analysis.

A first example of the specific aspect [1] includes the gas selector configured to select one of the gas supply sources to be fluidly connected to the sample gas generation part based on an instruction input by the user apart from setting of the analysis condition, and the controller is configured to control the gas switching part to fluidly connect the one of the gas supply sources selected by the gas selector to the sample gas generation part. According to such a configuration, the gas supply source fluidly connected to the sample gas generation part can be switched only by the user selecting a desired gas supply source at an optional timing, so that switching work of the gas supply source is facilitated.

Further, a second example of the specific aspect [1] includes the standby time memorizing part configured to memorize a standby time preset as required time from switching of the gas supply source fluidly connected to the gas generation part to completion of replacement of gas in every paths through which the carrier gas flows, and the information indicator configured to perform, at least when a gas type of the carrier gas is changed, in-replacing indication indicating that replacement of gas in a circulation path of the carrier gas is being performed on the display device during the standby time in a case where the gas supply source fluidly connected to the gas generation part is switched to another gas supply source. With such a configuration, the user can easily recognize that replacement of the gas in the circulation path of the carrier gas is being performed, and can easily grasp the timing at which the analysis is started. This second example can be combined with the first example described above.

A further specific example of the second example includes the standby time setting part configured to require the user to input a value for setting the standby time and to set the standby time based on the value input by the user. The standby time memorizing part is configured to memorize the standby time set by the standby time setting part. In this manner, the user can set an optional value as the standby time.

In the above specific example, furthermore, the standby time memorizing part may has memorized a default value of the standby time, and the standby time setting part may be configured to display the default value on the display device when requiring the user to input a value for setting the standby time. With such a configuration, the user can refer to the default value when setting the standby time, and it becomes easy to set the standby time as appropriate.

Further, in the second example of the specific aspect [1], the information indicator may be configured, when switching of the gas supply source fluidly connected to the gas generation part is performed, to display a gas type of the gas supply source had been fluidly connected to the gas generation part before the switching and a gas type of the gas supply source fluidly connected to the gas generation part after the switching, in the in-replacing indication. With such a configuration, the user can easily recognize how the gas type of the carrier gas is changed, and the analysis can be prevented from being performed with wrong gas.

Further, the second example of the specific aspect [1] includes the remaining time calculation part configured to measure elapsed time from when switching of the gas supply source fluidly connected to the gas generation part is performed, and to calculate remaining time of the standby time by subtracting the elapsed time from the standby time. The information indicator may be configured to indicate the remaining time calculated by the remaining time calculation part on the display device in the in-replacing indication. With such a configuration, the user can easily grasp time required to complete the replacement of the gas in the circulation path of the carrier gas.

DESCRIPTION OF REFERENCE SIGNS

2 Sample gas generation part
4 Autosampler
6 Separation column
8 Detector
10 Column oven
12A; 12B Gas supply source
14 Switching part
16 Regulator
18 Control device
20 Arithmetic processing part
22 Input device
24 Display device
26 Heater
28 Temperature sensor
30 Controller
32 Gas type identification part
36 Gas type memorizing part
38 Condition memorizing part
40 Standby time memorizing part
42 Remaining time calculation part
44 Gas type setting part
46 Condition setting part
48 Gas selector
50 Standby time setting part
52 Information indicator

What is claimed is:

1. A gas chromatograph comprising:
a sample gas generation part configured to generate a sample gas using a sample injected thereinto;
a separation column fluidly connected to an outlet of the sample gas generation part and for separating components included in the sample gas generated by the sample gas generation part;
a detector fluidly connected to an outlet of the separation column and for detecting the components separated in the separation column;
a plurality of gas supply sources for supplying gases serving as carrier gas for delivering the sample gas generated by the sample gas generation part to the separation column;
a switching part to which the plurality of gas supply sources are fluidly connected and configured to fluidly connect one of the plurality of gas supply sources to the sample gas generation part selectively by switching;
a gas type setting part configured to require a user to input types of gases of the plurality of gas supply sources connected to the switching part and configured to set the types of gases of the plurality of gas supply sources;
a gas type memorizing part configured to memorize the types of gases of the plurality of gas supply sources set by the gas type setting part,
a display device for displaying information to a user;
an input device for information input;
a condition setting part configured to set a gas type of the carrier gas as an analysis condition for analyzing a sample based on information input by the user using the display device and the input device;
a condition memorizing part configured to memorize the analysis condition set by the condition setting part; and
a controller configured to control operation of the switching part according to the analysis condition memorized by the condition memorizing part by using information memorized in the gas type memorizing part.

2. The gas chromatograph according to claim 1, further comprising:
a gas selector configured to select one of the gas supply sources to be fluidly connected to the sample gas generation part based on an instruction input by a user apart from setting of the analysis condition, wherein
the controller is configured to control the gas switching part to fluidly connect the one of the gas supply sources selected by the gas selector to the sample gas generation part.

3. The gas chromatograph according to claim 1, further comprising:
a standby time memorizing part configured to memorize a standby time preset as required time from switching of the gas supply source fluidly connected to the gas generation part to completion of replacement of gas in every paths through which the carrier gas flows; and
an information indicator configured to perform, at least when a gas type of the carrier gas is changed, in-replacing indication indicating that replacement of gas in a circulation path of the carrier gas is being performed on the display device during the standby time in a case where the gas supply source fluidly connected to the gas generation part is switched to another gas supply source.

4. The gas chromatograph according to claim 3, further comprising:
a standby time setting part configured to require a user to input a value for setting the standby time and to set the standby time based on the value input by the user, wherein
the standby time memorizing part is configured to memorize the standby time set by the standby time setting part.

5. The gas chromatograph according to claim 4, wherein
the standby time memorizing part has memorized a default value of the standby time, and
the standby time setting part is configured to display the default value on the display device when requiring a user to input a value for setting the standby time.

6. The gas chromatograph according to claim 3, wherein
the information indicator is configured, when switching of the gas supply source fluidly connected to the gas generation part is performed, to display a gas type of the gas supply source had been fluidly connected to the gas generation part before the switching and a gas type of the gas supply source fluidly connected to the gas generation part after the switching, in the in-replacing indication.

7. The gas chromatograph according to claim 3, further comprising:
a remaining time calculation part configured to measure elapsed time from when switching of the gas supply source fluidly connected to the gas generation part is performed, and to calculate remaining time of the standby time by subtracting the elapsed time from the standby time, wherein
the information indicator is configured to indicate the remaining time calculated by the remaining time calculation part on the display device in the in-replacing indication.

8. The gas chromatograph according to claim 1, further comprising a gas type identification part configured to recognize a state of the switching part automatically and to identify a gas type of the carrier gas supplied to the sample gas generating part based on the recognized state of the switching part and the information memorized by the gas type memorizing part.

\* \* \* \* \*